Figures 1, 2, 3:
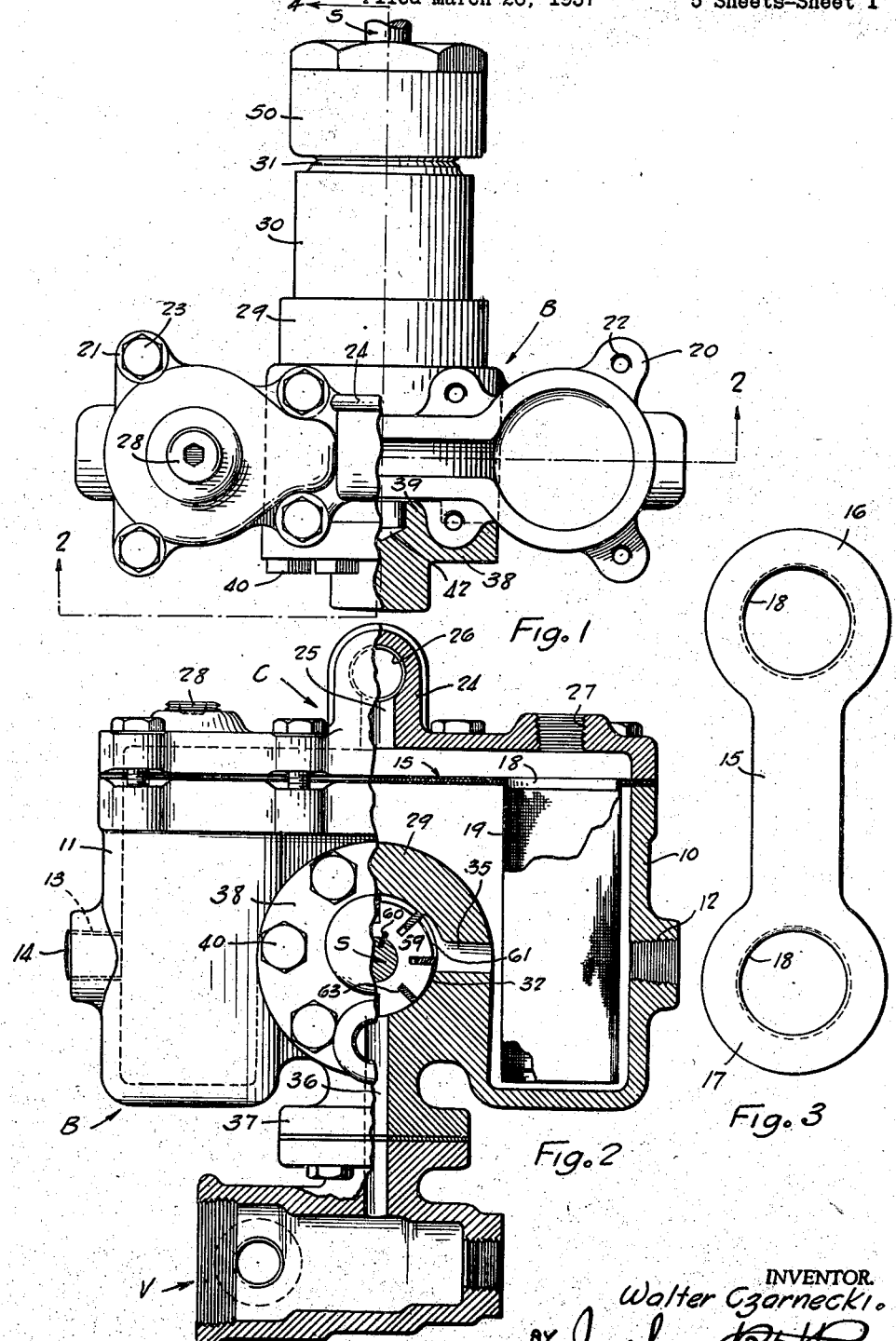

Oct. 3, 1939.    W. CZARNECKI    2,174,869
FUEL SUPPLY UNIT
Filed March 26, 1937    5 Sheets-Sheet 1

INVENTOR.
Walter Czarnecki.
BY Joshua R. H. Potts
ATTORNEY.

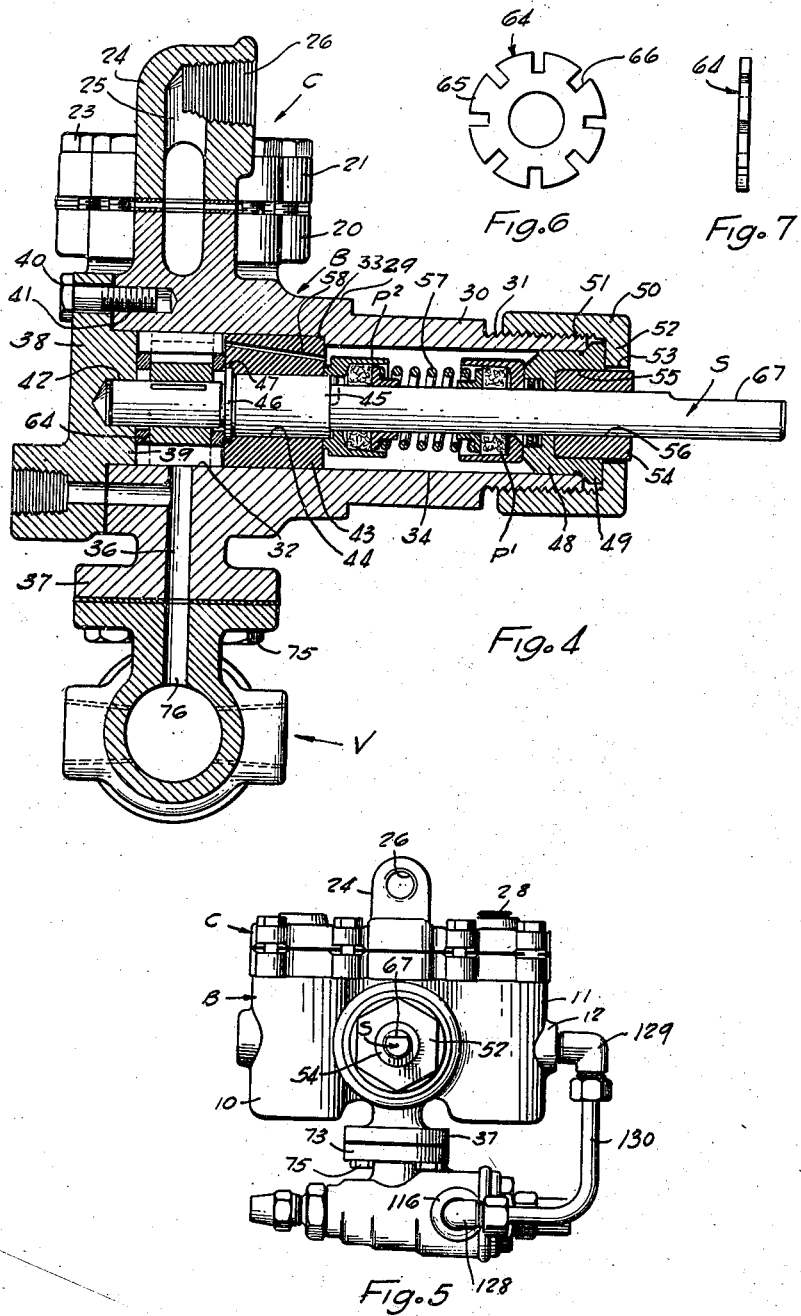

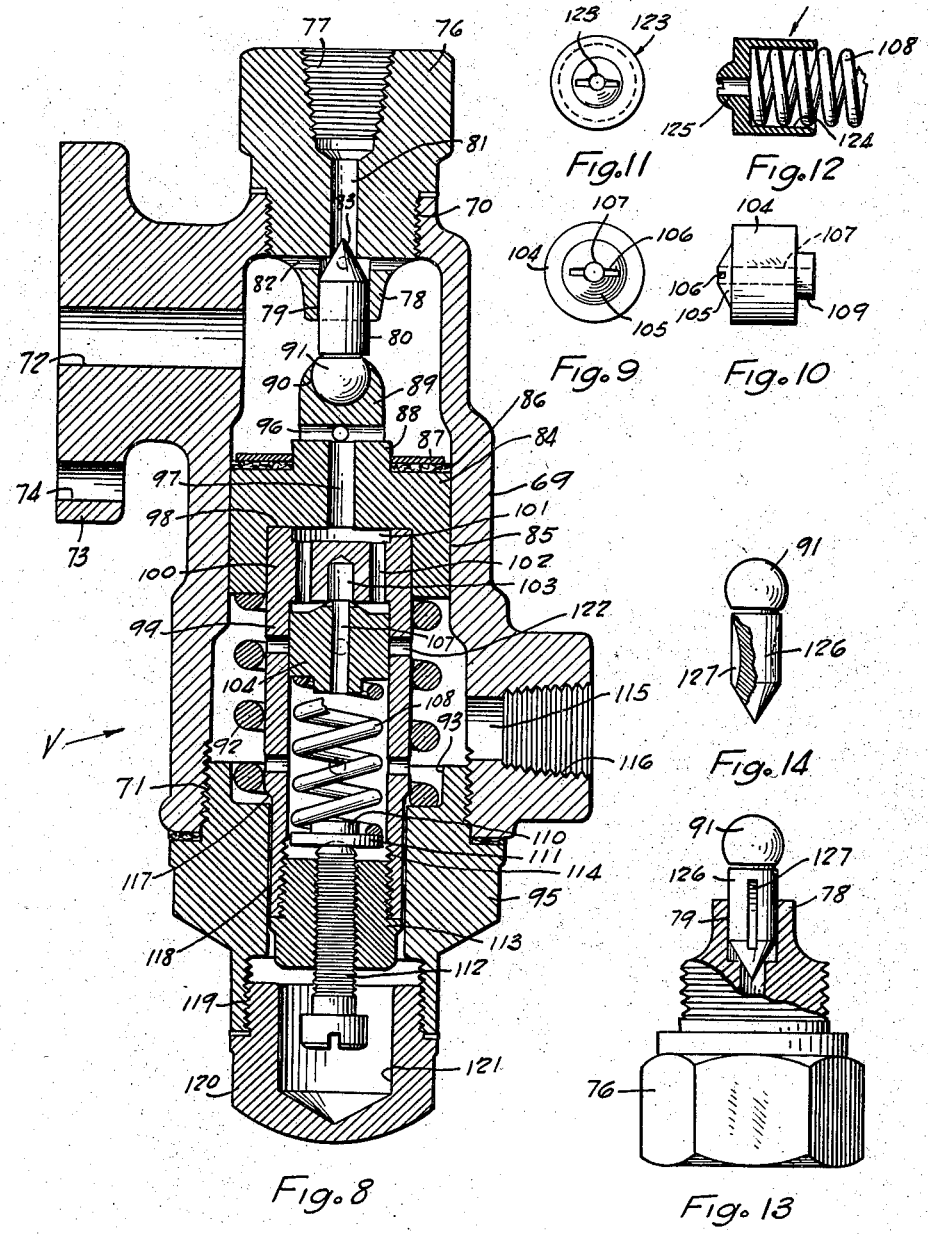

INVENTOR.
Walter Czarnecki.
BY Joshua R. H. Potts
ATTORNEY.

Oct. 3, 1939.  W. CZARNECKI  2,174,869
FUEL SUPPLY UNIT
Filed March 26, 1937   5 Sheets-Sheet 5
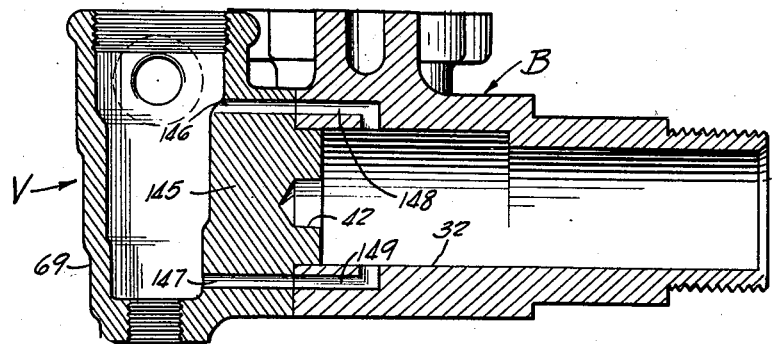
Fig. 21
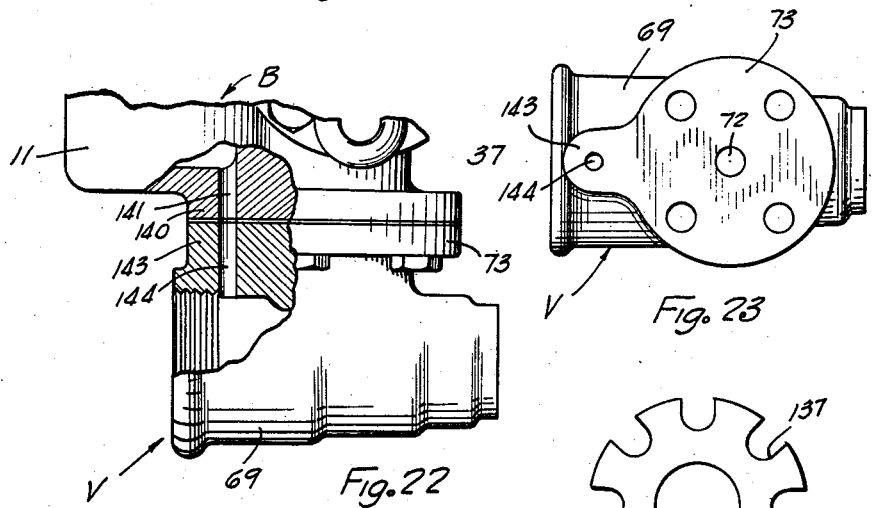
Fig. 22
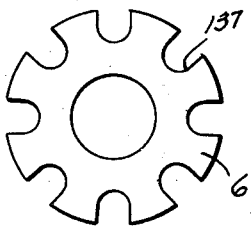
Fig. 23
Fig. 24
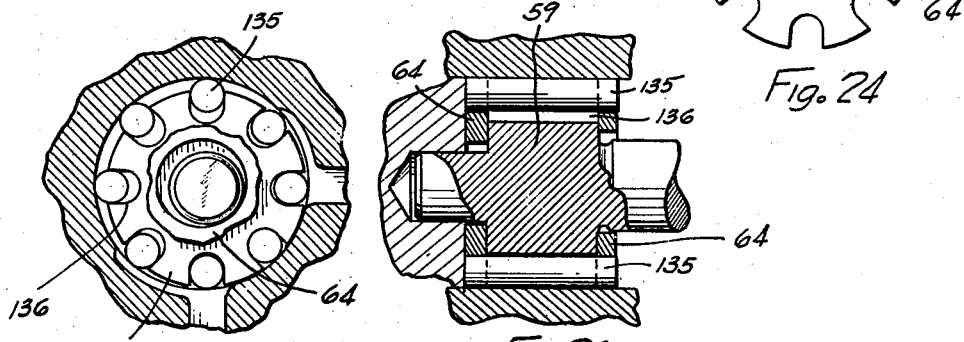
Fig. 25   Fig. 26
INVENTOR.
Walter Czarnecki.
BY Joshua R H Potts
ATTORNEY.

Patented Oct. 3, 1939

2,174,869

UNITED STATES PATENT OFFICE 2,174,869

FUEL SUPPLY UNIT

Walter Czarnecki, Eddington, Pa., assignor to Eddington Metal Specialty Co., a firm composed of Walter Czarnecki, Sr., Mary Czarnecki, Nellie Wojsowski, Wesley Czarnecki, Stanley Czarnecki, Walter V. Czarnecki, Jr., and Casimer Czarnecki, Eddington, Pa.

Application March 26, 1937, Serial No. 133,131

3 Claims. (Cl. 103—42)

This invention has to do with fuel supply units which are employed in conjunction with oil burners for the purpose of insuring that the fluid fuel is delivered to the burner in a properly strained condition and under a required degree of pressure.

Ordinarily a fuel supply unit of this character includes a strainer organization, fluid pump, and a pressure regulating valve. The strainer organization strains the fluid fuel coming from the source of supply to deliver the same in a properly strained condition to the pump. The pump builds up pressure in the fluid which is passed to the pressure regulating valve, and when a required degree of pressure is built up in the fluid the pressure regulating valve is effective to pass the same to the oil burner. If an excess of pressure in the fluid is built up in the pressure regulating valve, this excessive pressure is regulated by a bypass arrangement which bypasses fluid fuel back to the source of supply.

The present invention contemplates following the more or less conventional procedure outlined above, but has in view as an important object the provision of a fuel supply unit of this type, in which the strainer organization, fluid pump, and pressure regulating valve are assembled and corelated in a novel and improved manner which not only tends for improved results in the operation of the various elements, but also provides for assembling the same in a compact unit with increased simplicity in the assembly process.

Yet another object of the present invention lies in the provision of a fuel supply unit of the type above noted, in which a highly improved fluid pump of the rotary type is provided to render more efficient the process of building up pressure in the fluid.

Numerous detailed objects and features of the invention are tied up with the provision of the rotary pump mechanism which will be hereinafter described in detail.

Still another important object of the present invention is to provide in a fuel supply unit of the character above noted an improved pressure regulating valve which is designed particularly with the thought of maintaining constant and uniform the pressure at which fluid is delivered to the burner during long periods of service, and which pressure regulating valve may also be nicely adjusted to vary the pressure at which fluid will be bypassed back to the source of supply.

As above pointed out, it has been the practice in this art to bypass the fluid of excess pressure back to the source of supply. In accordance with the present invention, this fluid may be bypassed directly back to the pump, thereby simplifying the installation of the unit, as this bypass back to the pump may be included as a part of the unit, and thus eliminate the usual pipe line back to the source of supply.

Various other more detailed objects and advantages which arise in connection with carrying out the above noted thoughts in a practical embodiment will in part become apparent, and in part be hereinafter stated, as the description of the invention proceeds.

The invention, therefore, comprises a fuel supply unit for oil burners and the like, which consists of a strainer organization, improved fluid pump of the rotary type, and an improved pressure regulating valve, and which strainer organization, pump and pressure regulating valve are assembled in a novel manner.

An important phase of the invention lies in the adaptability of assembling the parts of the unit in several distinct manners, so as to accommodate particular conditions of installation. As will become apparent from the following description, the pressure regulating valve may be assembled in any one of several different positions with respect to the remainder of the unit, and the pressure regulating valve is effectively operable in any position in which it may be installed.

Figure 17:
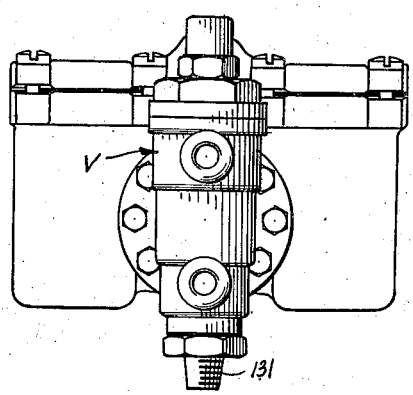
Figure 18:
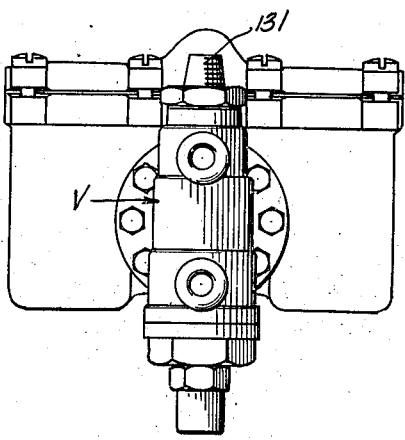
Figure 19:
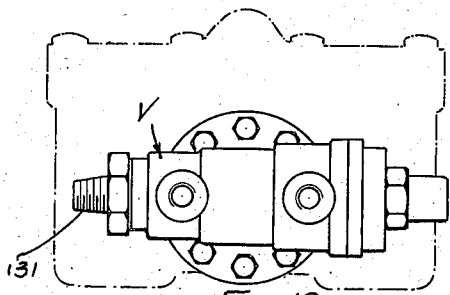
Figure 20:
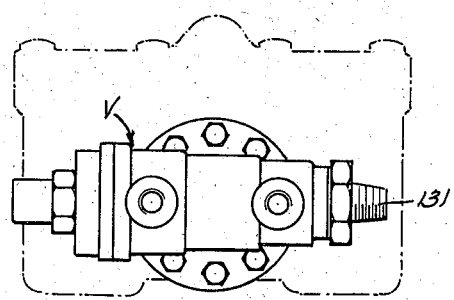
Figure 15:
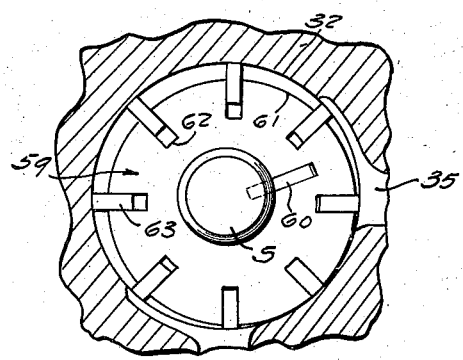
Figure 16:
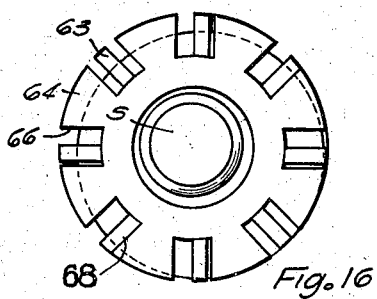

For a full and more complete understanding of the invention, reference may be had to the following description and accompanying drawings, wherein Figure 1 is a plan view partly in elevation and partly in section, of a fuel supply unit made in accordance with the precepts of this invention, Figure 2 is a side view partly in section and partly in elevation, which is taken at right angles to the showing of Figure 1. This view is taken about on the plane represented by the line 2—2 of Figure 1, Figure 3 is a detailed plan view of one of the strainer parts, Figure 4 is a vertical section through the unit taken about on the plane represented by the line 4—4 of Figure 1, Figure 5 is a side elevational showing of the modification, in which the bypass goes directly back to the pump, Figure 6 is a detailed plan view of one of the pump elements, as is Figure 7, which is a view taken at right angles to the showing of Figure 6, Figure 8 is a sectional view through the pressure regulating valve per se, Figure 9 is a plan elevational showing in detail of one of the pressure regulating valve parts, while Figure 10 is a side elevational showing taken at right angles to Figure 9, Figure 11 is a view similar to Figure 9 of a slight modification, while Figure 12 is a sectional view taken at right angles to the showing of Figure 11, Figure 13 is an enlarged detailed view partly in section and partly in elevation, of a modified valve mechanism which may be employed at the port to the burner, while Figure 14 is a detailed view, also partly in section and partly in elevation, of the valve member per se, Figure 15 is an enlarged detailed view bringing out the arrangement of blades in the rotor element of the pump, while Figure 16 is a similar view bringing out the disposition of the extremities of the blades and sealing rings at each end of the rotor, Figure 17 is a side elevational showing of a modification of the structure of Figures 1 to 8 inclusive, bringing out the relationship between the pressure regulating valve and the remainder of the unit in one position, Figure 18 is a view similar to Figure 17 of a similar modification, bringing out the pressure regulating valve in an inverted vertical position, Figure 19 is another similar showing of this modification, developing the pressure regulating valve in one horizontal position, Figure 20 is a view similar to Figure 19 of a modified form, bringing out the pressure regulating valve in an inverted horizontal position, Figure 21 is a sectional showing taken on a plane similar to Figure 4, but of a modified form, Figure 22 is a plan view, with parts broken away and shown in section of a modification in which the fluid is by-passed back to one of the strainer chambers, Figure 23 is an elevational showing taken at right angles to the plane of Figure 22, with the pressure regulating valve removed, Figure 24 is a detailed showing of one of the end rings for the pump modification shown in Figure 25, which is a section taken on a plane perpendicular to the axis of the pump chamber at one end of the rotor. In this view the rotor and blade structure of the pump are of a modified form, and Figure 26 is a sectional showing taken through the axis of the rotor, and of the modification shown in Figure 25.

Referring now to the drawings, wherein like reference characters denote corresponding parts, a fuel supply unit is shown as comprising a main body portion designated B, which may be made from any appropriate metal which is machined to accommodate the various mechanisms which are carried thereby, and other organizations which are attached thereto. The body portion B is formed with a pair of somewhat cylindrically shaped parts designated 10 and 11, each of which is intended to receive a strainer element, as will be hereinafter described in detail.

It is notable that each of these parts 10 and 11 of the casting may be provided with threaded openings at 12 and 13, respectively, which openings ordinarily will be plugged up, as indicated at 14, when the unit is used with a bypass going from the pressure regulating valve back to the source of supply. However, only one of these openings 12 and 13 will be plugged up when the bypass is from the pressure regulating valve directly back to this opening 12, which will be open, as shown at Figure 2.

The main body portion B is open at the upper extremities of the parts 10 and 11, and seated on the upper edge of the parts 10 and 11 is a strainer carrying member designated 15, which is shown in detail in Figure 3. This member 15 is provided with outer flat ring-like flanges 16 and 17 at each end, which are intended to rest on the upper edge of the circular parts 10 and 11. Concentric with the ring-like parts 16 and 17 are downwardly depending flanges 18, which have anchored thereto a circular straining element shown at 19 in Figure 2. These strainer elements 19 are substantially cylindrical in formation, and when positioned in the circular parts 10 and 11 of the main body portion B are spaced therefrom, as depicted in Figure 2.

A cap member is referred to in its entirety by the reference character C, and is shown as clamped on the main body portion B by an arrangement comprising flanges 20 on the body member B and flanges 21 on the cap member C. These flanges 20 and 21 are provided with openings, as shown at 22 in Figure 1, and headed screw bolts 23 pass through these openings and are screwed home to establish the clamped relationship.

It is notable that the cap member C is formed with an upwardly extending part designated 24, which is provided with a passageway 25 that communicates with the interior of the main body part B, and a threaded socket at 26, which constitutes a means for connecting a fluid supply conduit to the unit.

As shown in Figures 1 and 2, this cap member C may also be formed with threaded openings at 27, each of which is substantially concentric with the cylindrical parts 10 and 11, but under the conditions of usage illustrated in the drawings, these openings 27 will be closed by plugs, represented at 28.

Centrally thereof the main body portion B is formed with a circularly shaped portion 29 that extends in a direction at right angles to the axis of the cylindrical parts 10 and 11. This circularly shaped part 29 is reduced in diameter, as shown at 30 in Figures 1 and 4, and again reduced in diameter at 31, which reduced portion 31 is threaded, as illustrated in Figures 1 and 4. Extending throughout the central portion 29 is a circular opening or bore 32, which terminates at the shoulder indicated at 33. From the shoulder 33 rearwardly is a circular passage 34, the axis of which is out of alignment with the axis of the passageway 32. In other words, the circular passage 34 is eccentric to the passage 32.

The wall of the central part 29 is formed with an opening 35, which is shown in Figure 2, and which establishes communication between the bore 32 and the hollow interior of the main body part B, which receives the strainer elements 10 and 11. Obviously fluid fuel in the hollow part B may pass through this opening 35 into the bore 32.

Another passageway designated 36 establishes communication between the bore 32 and a pressure regulating valve, to be later described. It is notable that this passageway 36 extends through a flange 37, which constitutes a means for securing the pressure regulating valve in position on the main body part B.

An end closure for the bore 32 is shown at 38 as having an extension 39 which extends into the bore 32, and snugly fits therein. This closure 38 may be secured in position on the main body part B by the headed screw bolts 40, which extend through openings in the closure 38, and are screwed into threaded sockets 41 in the main body part B.

The closure member 38 is provided with a cylindrical socket 42, which is eccentric to the axis of the bore 32, and the axis of which socket 42 constitutes a continuation of the axis of the passage 34. In other words, the axes of the socket 42 and passage 34 are in alignment.

A bushing shown at 43 has an outer cylindrical surface which snugly receives the surface of the bore 32. It is notable that this bushing 43 is provided with a cylindrical bore 44, the axis of which is in alignment with the axes of the socket 42 and passage 34.

A shaft referred to in its entirety by the reference character S is shown as having one end received in the socket 42, whereby the latter is constituted a bearing for the shaft. This shaft S has an enlarged portion at 45 which is received in the bore 44 of the bushing 43, so that the bushing 43 constitutes a bearing for the shaft.

In order to prevent longitudinal movement of the shaft S the latter is formed with a flange at 46 which is received in a cut-away portion of the bushing 43, which is shown at 47. An end bushing designated 48 is fitted in the end of the passage 34 within the reduced threaded portion 41; this bushing 48 being provided with an end flange at 49 which engages the end of the reduced threaded part 31.

A cup member 50 has its inner cylindrical wall threaded, as shown at 51, and which threaded wall is screwed on to the threaded portion 41. This cup member 50 has a bottom 52 formed with an opening 53, the axis of which is in alignment with the axis of the passage 34. A bearing member 54 is received in a socket 55 which is formed in the bushing 48, and this bearing member 54 has a central bore 56 through which passes the shaft S.

A packing assembly is referred to in its entirety at P', and is effective to provide a seal between the shaft S and the bushing 48. Another packing assembly P² provides a seal between the shaft S and the bushing 43. A coil spring shown at 57 extends between the packing assemblies P' and P², respectively, and maintains these packing assemblies in effective position against these bushings 48 and 43, respectively.

A similar arrangement for providing seals at similar points in a rotary pump of the same type is clearly illustrated and described in the co-pending application of Walter Czarnecki, et al., for a "Pump", Serial No. 85,098, filed June 13, 1936, and the specification of this patent application is referred to for a detailed description of these packing assemblies.

A passageway is shown at 58 as extending lengthwise through the bushing 43, and is present for drainage purposes, which will be hereinafter described.

Keyed to the shaft S between the end closure 38 and bushing 43 is a rotor designated 59; a driving relationship between the rotor 59 and shaft S being established by the key shown at 60. The rotor 59 has an outer cylindrical surface designated 61, in which are cut a plurality of slots 62, the side walls of which are parallel to radii of the rotor, which radii extend between the walls of each slot 62.

Slidably received in each of the slots 62 are blades 63, which extend at each end beyond the rotor 59. Disposed between the rotor 59 and closure 38 at one end is a ring member 64, which ring member is shown in detail in Figures 6 and 7. This ring member is duplicated at the other end of the rotor 59, and is positioned between the extremity of the rotor 59 and bushing 43. Each of the ring members 64 has an outer periphery 65 which is snugly received in the bore 32, and extending inwardly from this peripheral edge are a plurality of slots 66, which correspond to the slots 62 in the rotor 59. However, it is notable that each of the slots 66 is wider than the slot 62, and each of the slots 66 has side edges which are parallel to radii of the bore 32, which radii extend between the walls of the slot.

The blades 63 at each end extend into the slots 66, as shown in Figures 4 and 16, and due to the slots 66 being wider than the blades 63, a small amount of relative movement between the extremities of the blades in these slots 66 in the ring 64 is provided for. It is notable that each blade 63 at all times is in engagement with the bore 32 on its outer edge, and the end portions on the inner edge engage with the bottoms of the slots 66 in the rings 64 at each end.

Provision is made for driving the shaft S in any preferred manner, as indicated by the flat 67, and when the shaft S in rotated a corresponding rotation is set up in the rotor 59. Due to the engagement of the end portions of the blades 63 with the bottoms of the slots 66 each of the blades 63 will be maintained in an outermost position with the edges of the blades 63 in engagement with the bore 32. Due to the eccentricity existing between the axes of the rotor and the bore 32 respectively the bore 32 will be effective to force the blades inwardly in the slots 62 incident to the rotation of the rotor 59.

Assuming that the rotor 59 is rotated in a counterclockwise direction with respect to the showing of Figure 2, it is notable that fluid passing through the openings 35 will enter into the space between the rotor and the bore 32. The blades 63 being in their outermost positions with the edges engaging the bore 32 will affect the fluid to build up pressure therein as the shaft is rotated, so that fluid under increased pressure is delivered to the passageway 36.

This sliding movement of the blades 63 in the slots 62 of the rotor 59 is accommodated by the breadth of the slots 66 in the rings 64; the action of the extremities of the blades in these slots 66 of the ring 64 being brought out clearly in Figure 16.

As the space between the bore 32 and cylindrical surface 61 of the rotor 59 decreases, speaking with reference to a counter-clockwise direction of the showing of Figures 15 and 16, the pressure on the fluid in this space will obviously increase, and at the same time the extremities of the blades 63 in the slots 66 will move from one wall of the slot over to the other, so at the time of maximum pressure on the fluid, which is just at or prior to the time of being forced into the passage 36, the surface of the blade which is forced against the fluid to build up the pressure will be in engagement with the side walls of the slots 66, as shown at 68 in Figure 16.

While the blade and associated pump structure illustrated in Figures 2, 4, 6, 7, 15 and 16 is designed with the blades and slots of a rectangular cross sectional shape, it is not essential that the blades be so formed. It is notable that the term blades as used throughout the specification is intended to refer to blades of any shape having the required ability to affect the fluid to build up pressure therein incident to rotation of the rotor in the manner illustrated.

Figures 24, 25 and 26 develop a slightly modified form in which the blades 135 are cylindrical in shape and operate in complementally shaped slots 136 formed in the rotor 59. Each of the end rings 64 will also be formed with similarly shaped notches 137, which are designed to accommodate the cylindrical blades 135.

In actual use the cylindrical blades 135 will probably present a noticeable advantage inherent to their cylindrical formation and mounting, which permits them to turn freely. As the rotor 59 is rotated, these cylindrical blades 135 will roll over the surface of the bore 32 with a minimum of resistance to turning of the rotor.

Despite the presence of the packing assembly $P^2$ a certain amount of the fluid fuel being operated on by the pump may escape into the space defined by the passage 34. In order to provide for the return of this fluid to the bore 32, the bushing 43 is formed with a channel 58 which is inclined and opens at its upper end into the pumping chamber defined by the bore 32 and rotor 59. At its lower end the channel 43 opens into the space defined by the passage 34. As the rotor 59 is rotated a certain amount of suction or partial vacuum is created to draw fluid from the passage 34 and pass it into the pumping chamber of the bore 32.

A pressure regulating valve is shown in Figures 2 and 4 as constituting a part of the fuel supply unit, and is referred to generally by the reference character V. The detailed construction of the various parts and mechanism of the pressure regulating valve are shown in Figures 8 to 13, inclusive.

Referring now more particularly to Figure 8, the pressure regulating valve V is shown as comprising a main body portion in the form of a casing 69, which is of a hollow construction so as to house the various valve parts. At one end the casing 69 is provided with a threaded opening designated 70, and at the opposite end with another threaded opening designated 71.

A passageway 72 is formed in a side wall of the casing 69, and constitutes a suitable continuation of the passageway 36 in the main body part B. The casing 69 may be provided with a flange at 73, through which extend openings 74 which accommodate headed bolts designated 75, shown more clearly in Figures 2 and 4. These bolts 75 are screwed into threaded openings in the flange 37, and serve to maintain the pressure regulating valve V assembled with the main body part B.

Screwed into the threaded opening 70 is a plug member 76 formed with a threaded socket 77, which is designed to have connected thereto a suitable conduit which leads to the oil burner. The plug member 76 is formed with an extension 78 extending into the hollow casing 69, and this plug member 78 is provided with a cylindrical socket 79 which slidably receives a valve member 80. The passageway 81 connects the sockets 79 and 77, and establishes communication therebetween. Speaking with respect to the axis of the socket 79, the walls of the extensions 78 are provided with a plurality of radially extending openings 82, which may be of any desired number, such as four in the illustrated embodiment.

The valve member 80 is formed with a conical tip 83, which when fitted in the extremity of the passageway 81 serves to seal the same and cut off communication to the oil burner. However, when the valve member 80 has slid in the socket 79 to unseat the conical tip 83 from the extremity of the passage 81, communication from the interior of the casing 69 through the passageway 82 to the passage 83 and socket 77 is established.

A piston element designated 84 is shown as slidable in a cylindrical portion of the casing 69, which is designated 85. In order to establish a properly sealed connection between the piston 84 and the cylindrical part 85 of the casing 69, a packing element is shown at 86 as being held in position by a ring 87 that may be pressed around a reduced cylindrical portion 88 of the piston.

Extending upwardly from the reduced portion 88 of the piston is a spherical projection 89 formed with a socket 90, which receives a ball 91 formed on the valve member 80. A coil spring, designated 92, engages the piston 84 at one end, and at the other end is received in a seat 93 formed in an end closure 95 that is screwed into the threaded opening 71. It is evident that the spring 92 normally urges the piston 84 upwardly, and thus maintains the conical tip 83 of the valve member 80 seated in the valve seat defined by the end of the passage 81. However, when sufficient pressure has been built up in fluid within the casing 69 above the piston, the piston 84 may be moved against the influence of the spring 92 to unseat the conical tip 83 of the valve member 80.

Just beneath the spherical extension 90 the piston 84 is provided with a plurality of radially disposed passageways 96, which may be of any desired number, say for instance four. These passageways 96 cross centrally of the piston, and communicating therewith is a central passage 97 that opens into a cup-like depression 98 formed in the piston 84.

A housing member 99 has one end received in the cup-like depression 98 of the piston 84, and the housing 99 is formed with an end structure referred to as 100. This end structure 100 is formed with a recess 101 into which opens the passage 97. Extending from the recess 101 into the interior of the housing 99 are a plurality of passages 102. The central part of the end structure 100 is formed with a recess 103, the edge of which constitutes a valve seat in a manner to be hereinafter described.

A valve member 104 is slidably positioned in the housing 99, and at its upper end is formed with a truncated conical projection 105 which is provided with a cross cut or kerf designated 106. This cross cut or kerf opens on each side of the conical projection 105. The valve member 104 is provided with a central passageway 107 that communicates with the cross cut 106. A coil spring shown at 108 has one end fitted about a projection 109 formed on the valve member 104, and its other end is fitted about a projection 110 formed on a backing member 111 which bears against a threaded stem 112 that is screwed into a plug member 113 that is threaded into the threaded end 114 of the housing 99. It is evident that the threaded stem 112 may be rotated to adjust the tension afforded by the spring 108.

When the valve member 104 is urged upwardly by the spring 108 so that the truncated conical extension 105 engages the edge of the valve seat 103, the cross cut 106 will be almost, but not quite, entirely closed, providing just sufficient opening therethrough to allow a so-called bleeding action, which is desirable in pressure valves of this type; the bleeding being to the bypass port identified at 115. This bypass shown at 115 communicates with a threaded socket 116, which may be used in connecting a bypass to the casing 69.

However, when sufficient pressure is built up on the fluid passing through the passages 96, 97, 101 and 102, the valve member 104 will be affected by the pressure to be moved against the influence of the spring 108, to open up the communication between the passages 102 and 107, and thereby insure of a proper bypassing of the fluid to the bypass port 115.

It is notable that the housing 99 moves with the piston 84, and this housing 99 is formed with a shoulder at 117 which serves to limit the movement of the piston 84. Obviously when the shoulder 117 strikes against the edge of the bore 118 formed in the end closure 95, further movement of the piston 84 is inhibited.

The bore 118 in the end closure 95 is enlarged and threaded, as shown at 119, and screwed thereinto is a cap member 120 having a cup-like recess 121 which accommodates the threaded stem 112.

The housing 99 is provided with a plurality of openings 122, which establish communication between the interior of the casing 69, and thus to the bypass shown at 115.

Referring now more particularly to Figures 11 and 12, a modified form of sliding valve is shown, which may take the place of the valve 104 shown in Figure 8. In this modification the valve member 104 is replaced by a cup-like valve member 123 having a recess 124 which receives one end of the spring 108; the longer passage 107 being replaced by the circular passage 125.

When the pressure valve illustrated in Figure 8 is installed in a position which is inverted from that shown, there may be a tendency for sediment to collect at the passages 82. In order to avoid any possibility of such sediment collection interfering with the proper operation of the valve at the burner port, a somewhat modified form of valve may be used at this point; such modification being shown at Figures 13 and 14. In this form the extension 78 is not formed with the passages 82, but the socket 79 receives a valve member 126, the cylindrical walls of which are provided with a plurality of cuts 127, which establish communication between the interior of the casing 69 and passage 81, when the valve member 126 is unseated from the valve seat defined by the passage 81.

When the bypass line which is attached to the socket 116 extends back to the fuel supply tank, both the sockets 12 and 13 in the main body part B will be closed, as by the plug shown at 14. However, there is shown an arrangement in Figure 5 in which an elbow designated 128 is threaded into the socket 116, while another elbow 129 is threaded into the socket 12.

Connecting the elbows 128 and 129 is a piece of tubing 130, which is bent to the proper shape. It is evident that fluid bypassed through the port 115 will be conducted through the elbow 128, tubing 130 and elbow 129, through the opening 12 into the main body part of the casing B. This compact arrangement obviates the need for providing a separate bypass line back to the source of fuel supply.

In Figures 22 and 23 there is developed a construction in which the structures of the casing B and casing 69 of the valve V are slightly modified to provide for a different form of bypass back to one of the strainer chambers.

It will be noted that the flange 37 of the casing B is formed with an ear 140 that is also integrally connected to the cylindrical part 11 of the casing B. This ear 140 is formed with a passageway 141 which extends from the face of the ear to the hollow interior of the casing part 11.

The wall of the valve casing 69 is formed with a flange 73 through which extends the inlet passage 72. This flange 73 engages and cooperates with the flange 37 to secure the valve V in position in the casing B, as above described. The flange 73 is formed with an extension 143 that is integral with the casing wall 69, and extending therethrough is a passageway 144 that constitutes the bypass port of the valve V. This passageway 144 is a continuation of the passage 141, and establishes communication between the casing 69 of the valve V and the strainer chamber 11.

Referring now more particularly to Figures 17 to 20, inclusive, it is noted that the pressure regulating valve V is installed with the connection intended to deliver fuel under proper pressure to the oil burner in the lowermost position; this connection being identified at 131. However, an important phase of the present invention is the adaptability of having this pressure regulating valve V assembled in other different relationships with respect to the remainder of the fuel supply unit. For instance, as shown in Figure 8, the pressure regulating valve V is in a vertical position, but the connection 131 to the oil burner is disposed at the top or in the uppermost position.

The pressure regulating valve of this invention may also be effectively installed in a horizontal position, as shown in Figures 19 and 20, and the connection 131 to the oil burner may be positioned at either side with respect to the remainder of the unit.

Figures 17 to 20, inclusive, show the pressure regulating valve V in alignment with the pump and when this arrangement is followed the internal construction of the valve casing and pump chamber is brought out in the sectional showing of Figure 21. This structure involves a considerable modification in the structure of the casing 13 and valve casing 69.

It will be noted from Figure 21 that the end closure 38 is replaced by a somewhat similar structure 145 formed as an integral part of the casing 69. In addition to the socket 42 this structure 145 is formed with passageways 146 and 147, which constitute the bypass and inlet ports respectively of the valve V.

The casing B is formed with passages 148 and 149 that are continuations of the passageways 146 and 147, when the parts are assembled, and these passages 148 and 149 open into the bore 32 in the manner illustrated. When the valve V is assembled on the casing B in the manner illustrated, fluid under built up pressure will be introduced into the valve V from the pump in bore 32 through the conduit comprising passages 147 and 149, while fluid will be bypassed from the valve V directly back to the pump in bore 32 through the conduit defined by passages 146 and 148. When the pressure regulating valve V is to be installed horizontally rather than vertically it is merely necessary to relocate the passages 148-149.

The operation of the various parts of the fuel supply unit above described is believed to be obvious. However, the mode of operation may be briefly described by noting that fluid fuel is conducted from a suitable source of fuel supply and introduced through the opening 26 into the space defined by the cap member C. The fluid fuel will pass through the openings defined by the turned-down flanges 18 into the strainers 19 and through the walls thereof into the space about the strainers in the main body part B.

The strained fluid will now pass through the opening 35 into the bore 32, and due to rotation of the shaft S pressure will be built up on this fluid by the blades 63 impinging thereagainst, and the fluid under increased pressure will be passed through the passages 36 and 72 into the interior of the casing 69 of the pressure regulating valve V.

When a required predetermined amount of pressure in the fluid has been attained, the effect of the spring 92 will be overcome to move the piston 84 and valve member 80 to unseat the conical tip 83 from the valve seat defined by the extremity of the passageway 81. The fluid, under a required degree of pressure, will then pass through the passages 82 and 81, and through the connection 131 which is threaded in the socket 77 to the oil burner.

If pressure on the fluid continues to build up, the effect of the spring 108 will also be overcome, and the valve 104 will be moved to unseat the truncated conical tip 105 from the valve seat 103, and fluid will pass through the passages 96, 97, 101, 102, 107 and openings 122 to the bypass port 115. From the bypass port the fluid will either go back to the source of fuel supply, or be bypassed directly to the opening 12 in the main body part B, as shown in Figure 5.

While preferred specific embodiments of the invention are hereinbefore set forth, it is to be clearly understood that I am not to be limited to the exact constructions illustrated and described, because various modifications of these details may be provided in putting the invention into practice within the purview of the appended claims.

I claim:

1. A fuel supply unit of the character described comprising a main body part having a central portion formed with a bore, pumping instrumentalities housed in said bore, a cap member, a strainer carrier clamped between the cap member and the main body part, straining elements carried by said carrier and extending into the main body part of the casing, there being a strainer disposed on each side of the said central portion, there being an opening establishing the communication from the main body part of the casing to the bore in the central part thereof, and a pressure regulating valve attached to the main body part, there being passages establishing communication between said bore and the pressure regulating valve.

2. A fuel supply unit of the character described comprising a main body part having a central portion formed with a bore, a rotary pump housed in said bore, there being an opening in one wall of the central part for admitting fluid to the rotary pump to have pressure built up therein, a strainer organization carried by the main body part and providing a strainer on each side of the rotary pump, and a pressure regulating valve affixed to said main body part, there being a passageway extending from said bore to the inlet port of the pressure regulating valve.

3. A fuel supply unit of the character described comprising a main body part formed with two circular portions, one on each side, and a circular central portion disposed between the said first mentioned circular portion, the axis of which extends at right angles to the axes of the side circular parts, said central portion being formed with a passageway establishing communication between said central portion and one of the side portions, straining elements disposed in said side circular parts, said straining elements being carried by a strainer carrier, a cap member, said carrier member being clamped between the cap member and the main body part, a rotary pump in said central circular part, a pressure regulating valve affixed to the main body part, and means for conducting fluid from the central circular part to the pressure regulating valve.

WALTER CZARNECKI.